United States Patent
Xia

(10) Patent No.: US 10,450,732 B2
(45) Date of Patent: Oct. 22, 2019

(54) FLUID DISPENSING SYSTEM, A SYSTEM FOR PROCESSING WASTE MATERIAL AND A FLUID MONITORING SYSTEM

(71) Applicant: Li Jun Xia, St. Leonards (AU)

(72) Inventor: Li Jun Xia, St. Leonards (AU)

(73) Assignee: Li Jun Xia, St. Leonards (AU)

( * ) Notice: Subject to any disclaimer, the term of this patent is extended or adjusted under 35 U.S.C. 154(b) by 0 days.

(21) Appl. No.: 15/511,263

(22) PCT Filed: Sep. 15, 2015

(86) PCT No.: PCT/AU2015/000568
§ 371 (c)(1),
(2) Date: Mar. 15, 2017

(87) PCT Pub. No.: WO2016/040986
PCT Pub. Date: Mar. 24, 2016

(65) Prior Publication Data
US 2017/0254055 A1     Sep. 7, 2017

(30) Foreign Application Priority Data

Sep. 16, 2014     (AU) ................................. 2014903690

(51) Int. Cl.
*E03C 1/05*     (2006.01)
*A47K 10/48*     (2006.01)
(Continued)

(52) U.S. Cl.
CPC .............. *E03C 1/057* (2013.01); *A47K 10/48* (2013.01); *B08B 3/12* (2013.01); *E03B 1/041* (2013.01);
(Continued)

(58) Field of Classification Search
CPC ............. E03C 1/055; E03C 1/057; E03C 1/22
See application file for complete search history.

(56) References Cited

U.S. PATENT DOCUMENTS

| 4,893,361 A * | 1/1990 | Burns ..................... E03C 1/126 134/1 |
| 2009/0077736 A1* | 3/2009 | Loberger .................. E03C 1/01 4/623 |

(Continued)

FOREIGN PATENT DOCUMENTS

| CN | 101680212 A | 3/2010 |
| CN | 103748754 A | 4/2014 |

(Continued)

OTHER PUBLICATIONS

Australian Patent Office, International Search Report, dated Dec. 23, 2015, Australia.

(Continued)

*Primary Examiner* — Janie M Loeppke
(74) *Attorney, Agent, or Firm* — Dinsmore & Shohl LLP

(57) ABSTRACT

Described herein is a fluid dispensing system, a system for processing waste material and a fluid monitoring system and a method of monitoring the quality of a fluid. One embodiment provides a fluid dispensing system (1) including a fluid dispenser (3) in fluid communication with at least one source of a first fluid. An identification device identifies a user of the system and generates a user identifier. A processor (19) is responsive to the user identifier to access a database (27) to retrieve user data indicative of one or more user preferences and, in response, generate a control signal. One or more electrical sensors (25) are configured to sense a gesture motion from the user and, in response, generate a local input signal. An actuator system (29) is responsive to the control signal and the local input signal to dispense the first fluid from the fluid dispenser with predefined characteristics.

11 Claims, 16 Drawing Sheets

(51) Int. Cl.
  *B08B 3/12* (2006.01)
  *E03C 1/18* (2006.01)
  *F16K 11/074* (2006.01)
  *E03B 1/04* (2006.01)
  *G05D 11/13* (2006.01)
  *G05D 23/13* (2006.01)
  *F16K 11/00* (2006.01)

(52) U.S. Cl.
  CPC ............... *E03B 1/042* (2013.01); *E03C 1/18* (2013.01); *F16K 11/0743* (2013.01); *F16K 19/006* (2013.01); *G05D 11/132* (2013.01); *G05D 23/1393* (2013.01); *A47K 2210/00* (2013.01); *E03B 2001/045* (2013.01)

(56) References Cited

U.S. PATENT DOCUMENTS

2009/0277508 A1* 11/2009 Pohl .................. E03C 1/055 137/88
2010/0148971 A1 6/2010 Wawrla et al.
2011/0320134 A1 12/2011 Butler et al.
2012/0017367 A1* 1/2012 Reeder .................. E03C 1/057 4/597
2012/0266973 A1* 10/2012 Gray ...................... E03C 1/055 137/334

FOREIGN PATENT DOCUMENTS

| GB | 2143724 A | 2/1985 |
| JP | 2001353087 A | 12/2001 |
| WO | 2013186507 A1 | 12/2013 |

OTHER PUBLICATIONS

Chinese Office Action cited in Chinese Application No. 201580062001.1 dated Nov. 8, 2018.

* cited by examiner

FLUID DISPENSING SYSTEM, A SYSTEM FOR PROCESSING WASTE MATERIAL AND A FLUID MONITORING SYSTEM

CROSS REFERENCE TO RELATED PATENT APPLICATION

This application is a National Phase Entry of International Application No. PCT/AU2015/000568, entitled "A FLUID DISPENSING SYSTEM, A SYSTEM FOR PROCESSING WASTE MATERIAL AND A FLUID MONITORING SYSTEM" and filed on Sep. 15, 2016, which claims priority to Australian Provisional Patent Application No. 2014903690, entitled "A FLUID DISPENSING SYSTEM, A SYSTEM FOR PROCESSING WASTE MATERIAL AND A FLUID MONITORING SYSTEM" and filed Sep. 16, 2014, the entire contents of each of which are incorporated herein by reference.

FIELD OF THE INVENTION

The present invention relates to a fluid dispensing system, a system for processing waste material and a fluid monitoring system. Embodiments of the invention have been particularly developed to provide a contactless faucet control system for dispensing water and other fluids having predetermined characteristics in response to predefined gestures by a user. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Various types of water dispensers exist in the home, workplace and public environments including kitchen, bathroom or laundry water faucets, showers and outdoor taps. Traditional fluid dispensers are manually actuated and include only the function of dispensing fluid from a fluid source. More recently, sophisticated faucets have been developed which offer a variety of functions and operate in a contactless manner.

U.S. Pat. No. 7,228,874 relates to a multifunctional faucet which is responsive to a plurality of proximity sensors triggered by a user to control the temperature and flow rate of water and other fluids to be dispensed. The sensors are disposed circumferentially about a circular end of the faucet and provide circumferentially separated sensing zones for detecting the user input.

There is significant room in the art for further development in personalised user functionality for fluid dispensing systems.

SUMMARY OF THE INVENTION

It is an object of the present invention to overcome or ameliorate at least one of the disadvantages of the prior art, or to provide a useful alternative.

In accordance with a first aspect of the present invention, there is provided a fluid dispensing system including:
a fluid dispenser in fluid communication with at least one source of a first fluid;
an identification device for identifying a user of the system and generating a user identifier;
a processor responsive to the user identifier to access a database to retrieve user data indicative of one or more user preferences and, in response, generate a control signal;
one or more electrical sensors configured to sense a gesture motion from the user and, in response, generate a local input signal; and
an actuator system responsive to the control signal and the local input signal to dispense the first fluid from the fluid dispenser with at least one predefined characteristic.

In one embodiment, the database is accessible through a remote server and the system includes a network communication device responsive to an instruction from the processor to access the remote server to retrieve the user data.

In one embodiment, the dispenser is in fluid connection with at least one source of hot water and one source of cold water. The dispenser is preferably in fluid connection with two sources of hot water and two sources of cold water.

In one embodiment, the dispenser includes a mixer valve and the actuator system is responsive to the input signal and/or the control signal to actuate the mixer valve so as to dispense water from the fluid dispenser at a temperature determined at least in part by the sensed gesture.

In one embodiment, the dispenser includes a pressure control valve and the actuator system is responsive to the sensor signals and/or control signal to actuate the pressure control valve so as to dispense the first fluid from the fluid dispenser at a pressure and/or flow rate determined at least in part by the sensed gesture.

In one embodiment, the dispensing system includes a hand dryer unit responsive to the input signal and/or control signal to generate airflow at a pressure, volume and/or temperature determined at least in part by the sensed gesture. Preferably the hand dryer unit is mounted to a body of the fluid dispenser. The hand dryer unit preferably includes a fan for generating an airflow, a first aperture for allowing the egress of the airflow in a first direction and a second aperture for allowing the egress of the airflow in a second direction. Preferably the first and second fans are independently responsive to different gestures.

In one embodiment, the fluid dispenser is configured for mounting adjacent a fluid receptacle to receive dispensed fluid. In one embodiment, the system includes an ultrasonic washing unit having one or more ultrasonic emitters mounted in or adjacent the fluid receptacle, the emitters being responsive to a predefined gesture. Preferably the actuator system is responsive to the input signal to selectively open and close a valve to releasably seal a drainage aperture in the fluid receptacle upon sensing of a predefined gesture.

In one embodiment, the processor is responsive to the input signal to distinguish the sensed gesture from a plurality of predefined gestures. Preferably the processor is in communication with a database for storing the predefined gestures.

In one embodiment, the gestures include a movement of the object through the detection fields of one or more sensors.

The gestures may include a movement of the object through the detection fields of more than one sensor in a predefined sequence. The gestures may also include maintaining the object within the field of a sensor for a predetermined period of time.

In one embodiment, the identification device includes a Bluetooth or NFC device configured to communicate wirelessly with a nearby mobile user device to obtain the user identifier.

The control signal may include a preferred water temperature for the user. The control signal may also include a preferred water flow rate for the user.

In one embodiment, the identification device includes a camera configured to capture an image of the user's face and wherein the processor is configured to execute facial recognition on the image to generate the user identifier.

In one embodiment, the identification device includes a fingerprint scanner configured to capture an image of the user's fingerprint and wherein the processor derives the user identifier from the image.

In one embodiment, the system includes a display responsive to the control signal for displaying content. Preferably the content is relevant to the user data. In one embodiment, the content includes advertising relevant to the one or more user preferences. In one embodiment, the content includes instructions on how to operate the system.

In one embodiment, the at least one predetermined characteristic includes one or more of a predefined temperature, a predefined flow rate, a predefined dispensing time, a predefined distribution profile and/or a predefined fluid quality.

In accordance with a second aspect of the present invention, there is provided a fluid dispensing system including:
- a fluid dispenser in fluid connection with at least one source of a first fluid for selectively dispensing the first fluid;
- an identification device for identifying a user of the system and generating a user identifier;
- a network communication device responsive to the user identifier to access a remote server to retrieve user data indicative of one or more user preferences;
- a processor responsive to the user data to generate a control signal; and
- a display responsive to the control signal for displaying user specific content.

In one embodiment, the content includes advertising relevant to the one or more user preferences. In one embodiment, the content includes instructions on how to operate the system.

The display is preferably a touchscreen device.

In accordance with a third aspect of the present invention, there is provided a system for processing waste material, the system including:
- an input conduit for receiving the waste material;
- one or more sensors mounted within or adjacent the input conduit so as to be exposed to a flow of the waste material, the one or more sensors configured to sense the presence or concentration of one or more components within the waste material passed through the conduit and, in response, generating a sensor signal; and
- one or more actuators responsive to the sensor signal for selectively directing the waste material into two or more output conduits.

In one embodiment, the output conduits include a sewage output conduit in fluid connection with a mains sewage line. In one embodiment, the output conduits include a recycling conduit in fluid connection with a recycling system.

In one embodiment:
one of the sensors includes a chemical sensor adapted to detect one more chemicals present in the waste material and, in response, generate a chemical indicator; and
the output conduits include a chemical processing conduit in fluid connection with a chemical processing system;
wherein an actuator is responsive to the chemical indicator to selectively direct the waste material into the chemical processing conduit.

In one embodiment:
one of the sensors includes a turbidity sensor adapted to detect one more solids present in the waste material and, in response, generate a turbidity indicator; and
the output conduits include a recycling conduit in fluid connection with a recycling system;
wherein an actuator is responsive to the turbidity sensor signal to selectively direct the waste material into the recycling conduit.

In one embodiment, at least one of the sensors is mounted within the input conduit.

In one embodiment, the input conduit is a drainage pipe for a material container and at least one of the sensors is mounted on the base of the container adjacent the drainage pipe.

In one embodiment, one sensor is adapted to detect the salinity of the material.

In accordance with a fourth aspect of the present invention, there is provided a fluid monitoring system, including:
- a fluid input in fluid communication with an upstream fluid source;
- one or more sensors disposed within the fluid input in contact with a flow of the fluid from the fluid source, the one or more sensors configured to sense one or more characteristics of the fluid and, in response, generate data indicative of the fluid quality;
- a communications module for remotely accessing an online database of reference fluid quality data; and
- a processor configured to compare the measured fluid quality data with reference fluid quality data and, in response, generate a control signal;
- one or more fluid modifier devices responsive to the control signal for selectively modifying the components of the fluid; and
- a fluid output for passing the modified fluid to a downstream fluid dispenser.

In one embodiment, the sensors are configured to sense one or more of the chlorine content, amount of pesticides, pH level, fluoride heavy metals content and/or radioactivity concentration of the fluid.

In one embodiment, the fluid modifier devices include one or more particle filters.

In one embodiment, the fluid modifier devices include one or more component sources and associated component dispensers for selectively dispensing a component into the fluid.

In one embodiment, the sensors detect the fluid quality in real or near-real time.

Preferably the fluid is drinking water.

In one embodiment, the fluid monitoring system includes a pre-processing unit disposed between the fluid input and the one or more sensors for performing an initial processing of the input fluid.

In one embodiment, the control signal is also based on one or more predefined user settings.

In accordance with a fifth aspect of the present invention, there is provided a method of monitoring the quality of a fluid, the method including the steps of:
a) passing a fluid through a sensing zone;
b) obtaining data indicative of one or more characteristics of the fluid in the sensing zone;
c) comparing the fluid data with data in a database;

d) in response to the comparison, selectively modifying the components of the fluid.

In accordance with a sixth aspect of the present invention, there is provided a fluid dispensing system including:
- a fluid dispenser in fluid connection with at least one source of a first fluid;
- a database for storing predefined gestures;
- one or more electrical sensors configured to sense a gesture motion from the user;
- a processor adapted to compare the sensed gesture with the predefined gestures and, in response, generate a control signal; and
- an actuator system responsive to the control signal to dispense the first fluid from the fluid dispenser with predefined characteristics associated with the gesture.

In accordance with a seventh aspect of the present invention, there is provided a fluid dispensing system including:
- a fluid dispenser for dispensing an output fluid;
- a fluid line connecting the dispenser to at least a source of water;
- a system of fluid modifiers positioned along the fluid line and adapted for selectively modifying the water;
- an interface for receiving user input to generate a control signal;
- an actuator system responsive to the control signal to selectively actuate one or more of the fluid modifiers to selectively modify the water to produce the output fluid, wherein between subsequent dispensing of the output fluid, the actuator system is actuated to dispense the water as the output fluid to clean the fluid line.

In one embodiment, one fluid modifier includes a carbonator for carbonating the water and further fluid modifiers include flavoured syrup dispensers for adding flavoured syrup to the water.

BRIEF DESCRIPTION OF THE DRAWINGS

Embodiments of the invention will now be described, by way of example only, with reference to the accompanying drawings in which.

DETAILED DESCRIPTION

Overview

Figure 1:
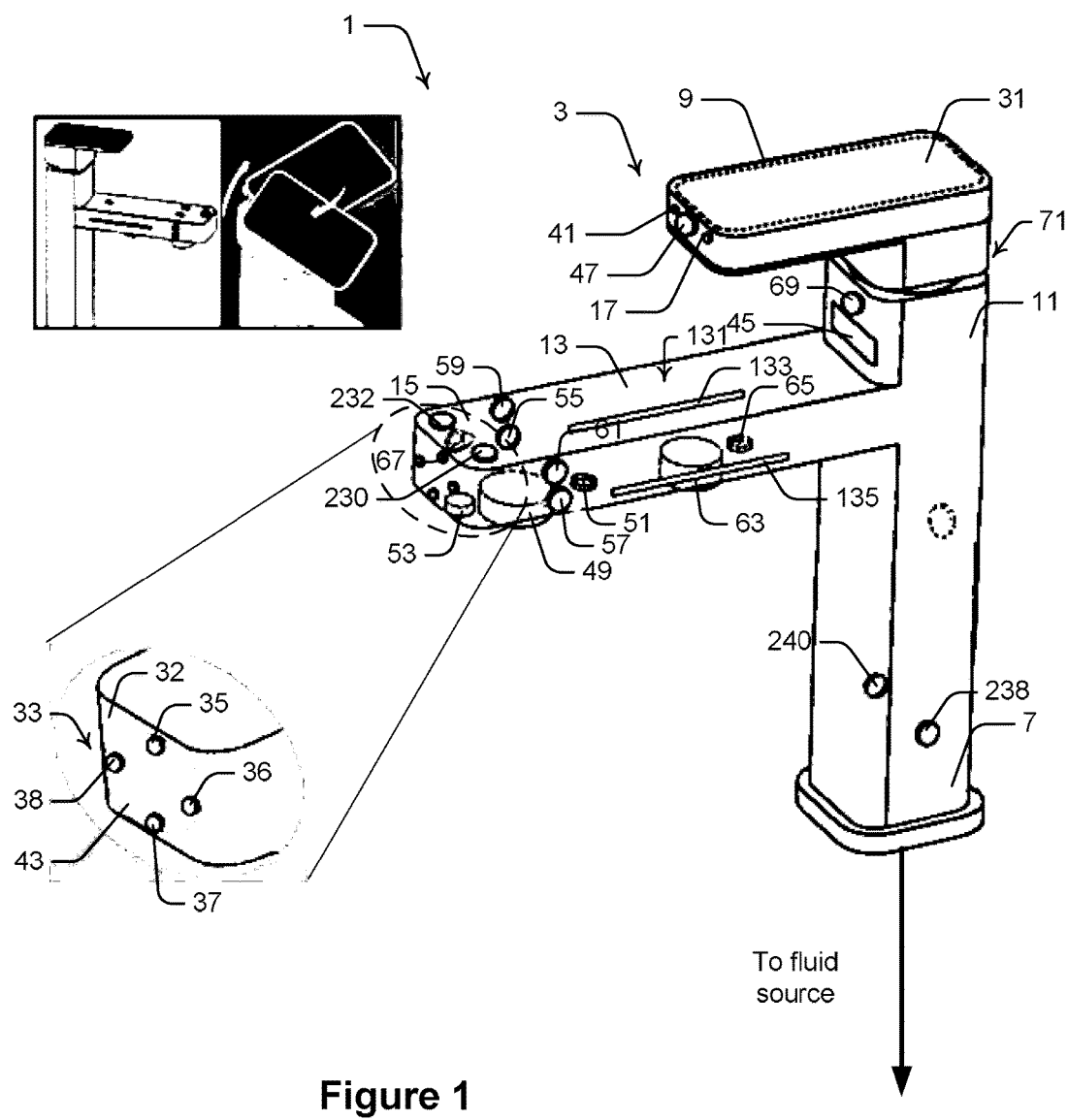
FIG. 1 schematically illustrates a side elevated perspective view of a fluid dispenser according to an embodiment of the invention.
Figure 2:
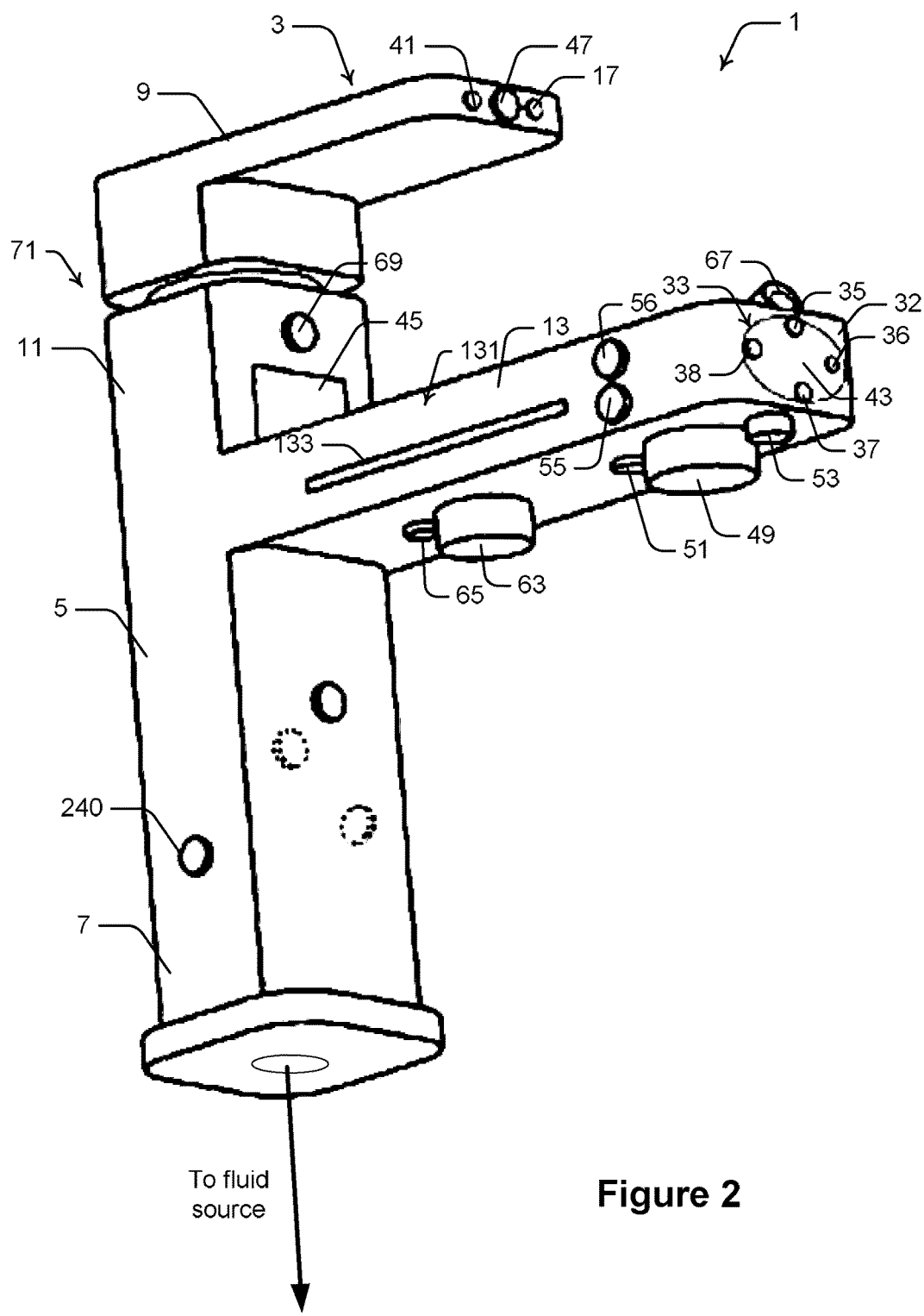
FIG. 2 schematically illustrates a lower side perspective view of the fluid dispenser of FIG. 1.
Figure 3:
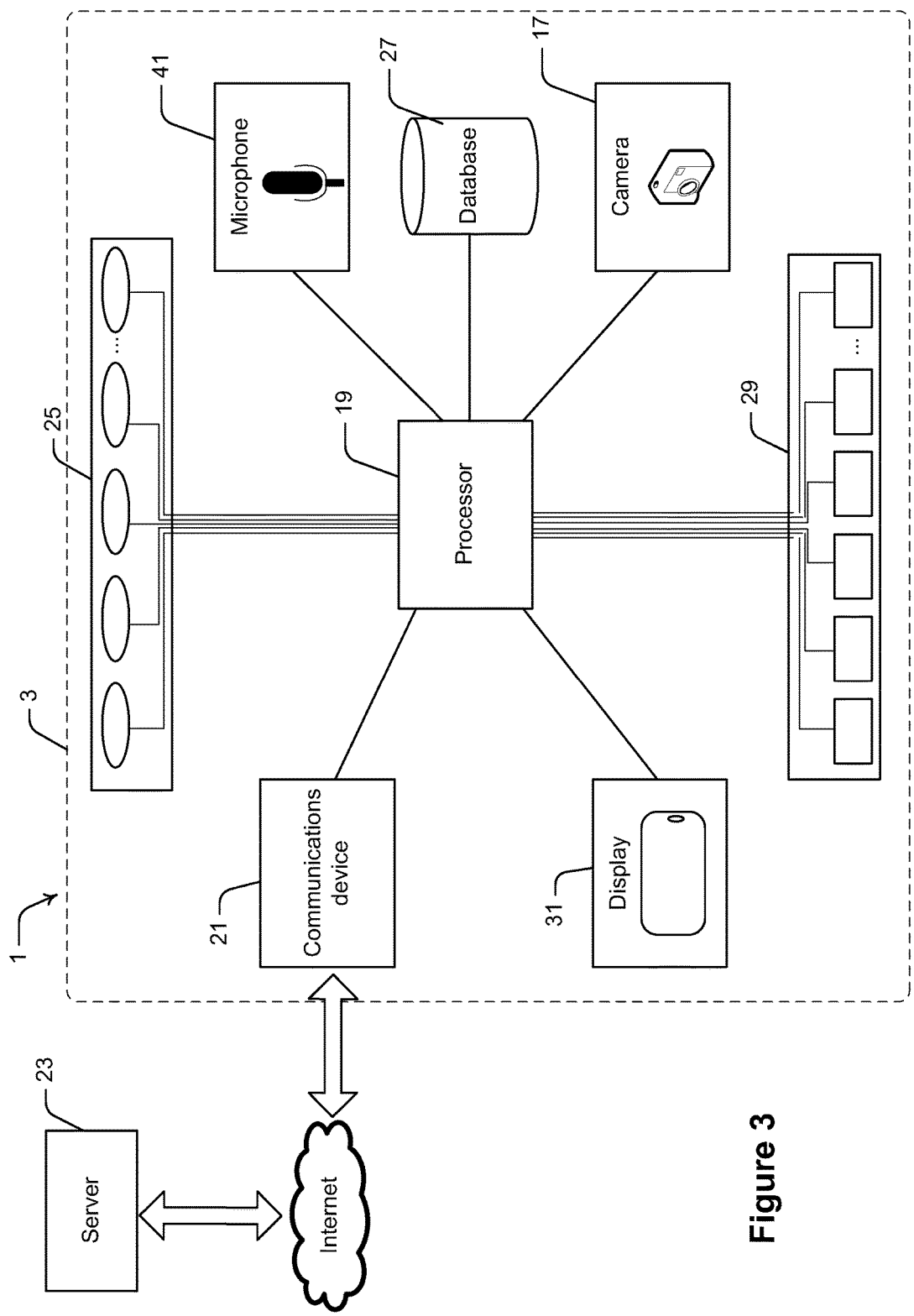
FIG. 3 illustrates a schematic system-level diagram of a fluid dispensing system according to an embodiment of the invention.

Referring to FIGS. 1 to 3, there is illustrated a fluid dispensing system 1. System 1 is particularly adapted to function as a kitchen or bathroom water dispenser to dispense water as a primary fluid and optionally other fluids on demand. It will be appreciated, however, that equivalent systems can be developed for dispensing other fluids such as beverages. One particular embodiment of the present invention is adapted for use as a public water fountain located in an airport, shopping mall or other public location. The water fountain is adapted to dispense fluids and/or perform other functions based on the detection of the current user.

System 1 includes a water dispenser 3 in fluid connection with one or more sources of both hot water and cold water. Dispenser 3 includes a substantially vertically disposed base 5 which is securably engagable, at a lower end 7, to a fixing such as a kitchen or bathroom sink (not shown). Base 5 has a substantially square-shaped horizontal cross section. A handle 9 is pivotally mounted to, and extending substantially horizontally from an upper end 11 of base 5. A substantially horizontally disped dispensing arm 13 is integrally connected to base 5 intermediate the lower and upper ends but proximal to upper end 11. A distal end 15 of dispensing arm 13 includes a plurality of fluid outlets as will be described below.

Dispensing arm 13 has a substantially rectangular vertical cross section with the horizontal dimension being slightly larger than the vertical dimension. Base 5 is about 25 cm in vertical height between the upper and lower ends and, in other embodiments, preferably between about 20 cm to 30 cm in height. Dispensing arm 13 is about 10 cm in horizontal length and, in other embodiments, is preferably between about 7 cm to 15 cm.

Base 5 and dispensing arm 13 include internal fluid conduits (not shown) extending between lower end 7 of base 5 and distal end 15 of dispensing arm 13 for transporting water between connected water sources and the various water outlets. As described below, other internal conduits are provided for dispensing other fluids such as liquid soap and for providing electrical wiring to power sensors and actuators disposed within dispenser 3.

An identification device in the form of a camera 17 is positioned on a front side section of handle 9. Camera 17 is configured to identify a user of system 1 through facial recognition, iris recognition or other visual biometric identification. Camera 17 is connected to a processor 19, which processes captured images of the user's face and generates a user identifier. A network communication device 21 is responsive to the user identifier to access a remote server 23 to retrieve user data indicative of one or more user preferences. Processor 19 is responsive to the user data to generate a control signal.

System 1 includes a sensor system 25 having electrical sensors disposed at various positions along dispensing arm 13 and base 5. The sensors are connected to a power source (not shown) and, in use, are configured to individually or collectively sense a gesture motion from the user. In response, the sensors individually or collectively generate an electrical local input signal or signals. Details of the specific sensors in system 25 are outlined below. In some embodiments, one or more sensors are replaced with actuatable push buttons.

Processor 19 is also responsive to the input signal to distinguish the sensed gesture from a plurality of predefined gestures. The predefined gestures are stored in a database 27, which is in communication with processor 19. In some embodiments, processor 19 and/or database 27 are not located within system 1 but are accessed remotely by communications device 21.

The stored predefined gestures are associated with respective functional controls for selectively controlling a plurality of actuators within an actuator system 29. The actuators are responsive to the control signal and the local input signals to dispense water from fluid dispenser 3 with predefined characteristics. The actuators, which are disposed at various locations on fluid dispenser 3 and surrounding elements, are electromechanical in nature to translate the electrical control and local input signals to a mechanical action. The predefined characteristics include but are not limited to one or more of a predefined temperature, a predefined flow rate, a predefined dispensing time, a predefined distribution profile and/or a predefined fluid quality.

The gestures sensed by the various sensors include a range of potential movements of the user's hands (or other objects) through the detection fields of the sensors. An exemplary gesture includes the movement of the user's hands through the detection fields of more than one sensor in a predefined sequence. Another exemplary gesture includes maintaining a user's hand within the field of a single sensor for a predetermined period of time.

Figure 4:
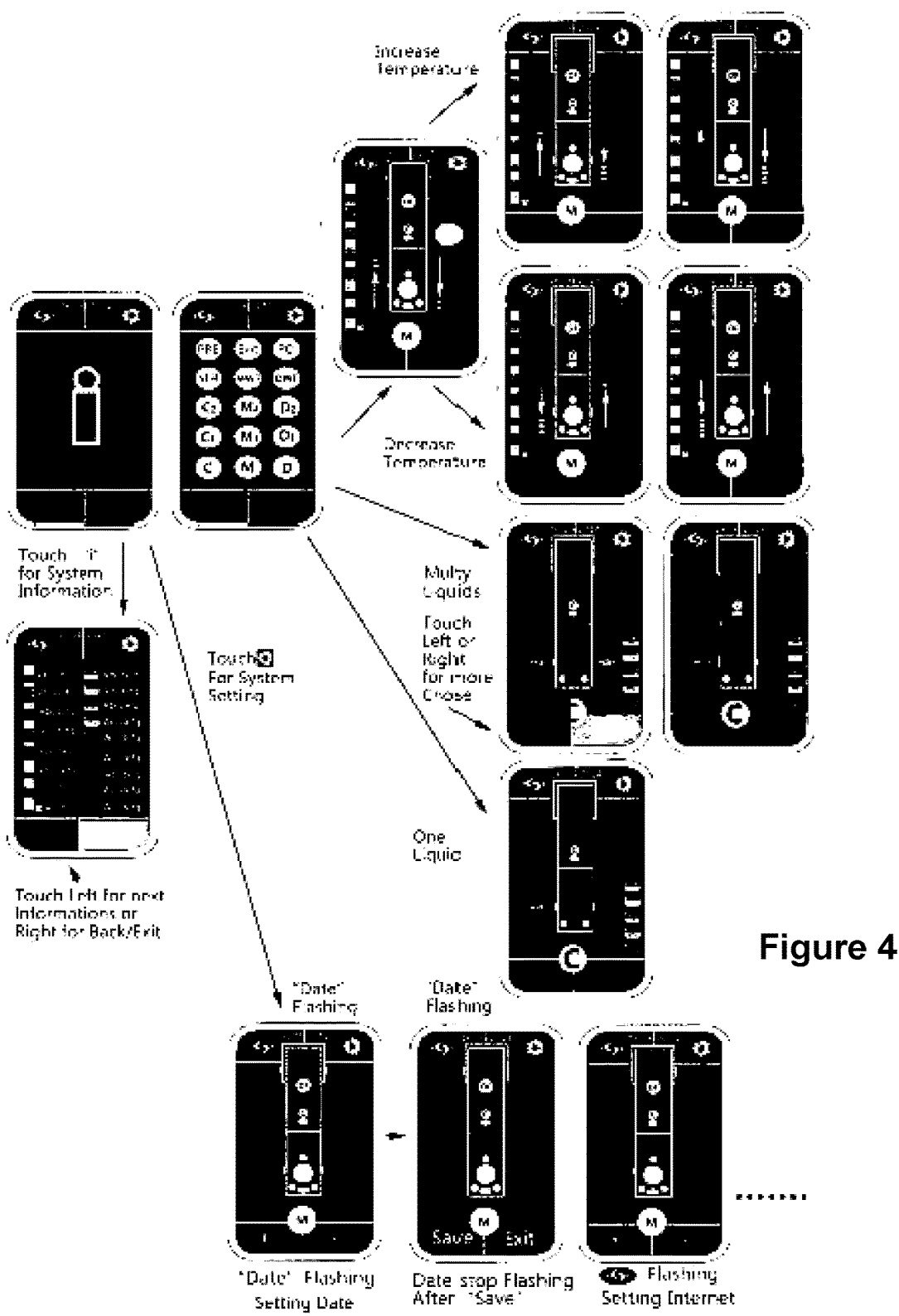
FIG. 4 illustrates exemplary screens displayed on a touchscreen display illustrating instructions for gesture controls.
Figure 5:
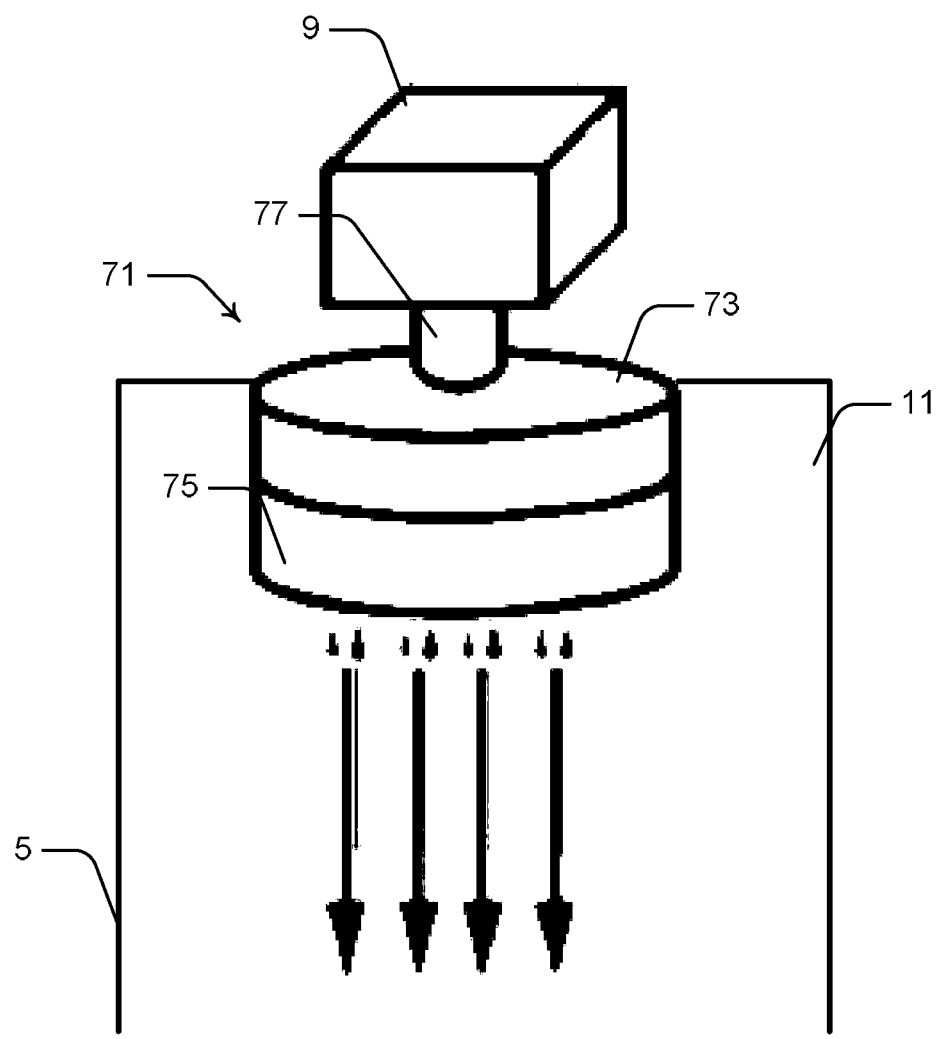
FIG. 5 illustrates a partial side view of the dispenser of FIG. 1 focussing on a mixer valve.

System 1 also includes a touchscreen display 31 disposed on an upper surface of handle 9. Display 31 is responsive to the control signal for displaying content relevant to the user data. For example, the content may include advertising relevant to the one or more user preferences such as the user's age, sex or location. Display 31 is also configured to, upon a request by the user, display instructions on how to operate one or more aspects of the dispensing system. Display 31 is configured to operate as a user interface by accepting user feedback in the form of touch inputs. Various screens of content such as instructions can be navigated by the user by providing appropriate touch inputs. Exemplary screens illustrating instructions for gesture controls are illustrated in FIG. 4.

As illustrated in the inset of FIG. 1, display 31 and handle 9 are able to be manually or automatically pivotally swivelled with respect to base 5. In a manual mode of operation, this motion dispenses water at a predetermined temperature and flow rate in a similar manner to that of known mixer taps.

A further display system 33 is disposed on an end face 32 of dispensing arm 13. Display system 33 includes four vertically and horizontally separated LEDs 35 to 38. Each LED is configured to radiate light of a predetermined colour at a predetermined time in response to the sensed gesture. The colour, duration and illumination profile (flashing, constant illumination etc.) is indicative of the particular gesture sensed. For example, if a gesture is detected which results in the dispensing of cold water for five seconds, one or more LEDs may be configured to illuminate in blue for the five second period.

System 1 is further adapted to receive voice commands issued by the user through a microphone 41 disposed on handle 9. The voice commands are processed by processor 19, compared to commands stored in database 27 and converted to a relevant voice control signal. The voice control signal is sent to appropriate actuators to carry out predefined functions.

The identification device also includes a fingerprint scanner 43 disposed on a end face 32 of dispensing arm 13. Scanner 43 is configured to capture an image of the user's fingerprint and processor 19 derives the user identifier from the captured fingerprint image. In another embodiment, fingerprint scanner is incorporated into touchscreen display 31. In further embodiments (not shown), the identification device includes an integrated Bluetooth or near field communication (NFC) device configured to communicate wirelessly with a nearby mobile user device (such as a Smartphone or tablet computer) to obtain the user identifier. In one embodiment, the identification device is linked with microphone 41 and is adapted to identify the user through voice recognition software.

A further display screen 45 is mounted within a front face of upper end 11. Screen 45 is adapted to display various information such as the current water temperature and detected gestures. In some lower cost embodiments, display 31 is omitted from handle 9 and screen 45 becomes a primary display for system 1.

To use system 1, a user first approaches the dispenser 3 and stands face-on towards camera 17. Camera 17 captures an image of the user's face and the user is identified. Relevant user data is retrieved and the associated user preferences are set by a corresponding control signal. The user preferences are set in advance by a method described below. The user then performs a gesture with their hand or hands such that the hands fall within one or more detection fields of the sensors various of sensor system 25. The gesture is detected and, if matched with a predefined gesture, a corresponding local input signal and the control signal control the actuators to dispense water at a predefined temperature and flow rate. The temperature and flow rate are defined by the user preferences and the particular gesture performed by the user. By way of example, the user's stored preference may be to dispense drinking water at a temperature of 6° C. but the user performs a gesture to decrease the temperature by a further 1° C. in that instance. The user can apply further gestures in sequence such as to further reduce (or increase) the temperature of the water being dispensed.

The operation of the sensors can be activated and deactivated by actuation of a push button 47 disposed on a front face of handle 9 adjacent camera 17. Actuation of button 47 effectively switches operation of system 1 between a manual and touchless mode of operation.

To input user preferences, the user navigates the interface provided by display 31 to a user preference section. This allows access to user data stored in database 27 or in a remote network or cloud-based database accessible through communications device 21. Various inputs such as text fields, drop boxes and slider controls are presented to the user for allowing the setting of the various user preferences.

The user may also input user preferences through a remote computer in communication with server 23. Once selected, these preferences are stored in association with the user identifier as user data. The data is stored locally and/or in a network or cloud-based database. Relevant security login details may be required to change the user preferences.

Furthermore, in some embodiments, communications device 21 is adapted to communicate with nearby devices such as mobile phones or tablet computers and the user can access system 1 through an associated third party software application to change user preferences.

System 1 is capable of performing a number of other functions and these are described below.

Multi Fluid Dispensing

Referring again to FIGS. 1 and 2, dispenser 3 includes a primary fluid outlet 49 for dispensing normal daily use water substantially vertically downwardly for everyday purposes such as washing, cooking and drinking. Outlet 49 is responsive to a gesture detected by sensor 51 disposed on an underside of dispensing arm 13 adjacent outlet 49.

Also adjacent outlet 49 is a drinkable water outlet 53 for dispensing, in a substantially vertically downward direction, filtered or purified water that has been passed through a processing system and is more suitable for drinking. Outlet 53 is responsive to a gesture detected by sensor 49 that is different from the gesture detected to dispense untreated water from outlet 49.

In an exemplary embodiment, the choice of which type of water to dispense is determined by different gestures detected by sensor 49 and also by sensors 55 and 57 disposed on opposing sides of dispensing arm 13. To dispense normal untreated water from outlet 49, a user simply places an object (for example, the user's hands or a container to be filled) within the detection field of sensor 51. Water will automatically be dispensed from outlet 49 at a temperature and flow determined by the user preferences or other default settings for a predetermined time or until the object is removed from the detection field. With the object maintained within the detection field, the user is able to adjust the temperature up by passing their hand through left sensor 55 or down by passing their hand through right sensor 57.

In this embodiment, filtered or purified water is dispensed from outlet 49 by first actuating one of sensors 59 or 61 also disposed on opposing sides of dispensing arm 13. Sensor 59 specifies that hot filtered water is desired while sensor 61 specifies that chilled filtered water is desired. The user subsequently places a container (for example a cup, bottle or the like) into the detection field of sensor 51 and adjacent outlet 53. Filtered or purified water is automatically dispensed through outlet 54 at a temperature and flow determined by the user preferences or other default settings for a predetermined time or until the container is removed from the detection field. With the container maintained within the detection field, the user is able to adjust the temperature up by passing their hand through left sensor 55 or down by passing their hand through right sensor 57.

A cleaning fluid outlet 63 is located about midway along dispensing arm 13 and is adapted to dispense a cleaning fluid such as soap or detergent substantially downwardly. Outlet 63 is responsive to a gesture detected by sensor 65 disposed on dispensing head 13 immediately adjacent outlet 63. In bathroom sink arrangements, outlet 63 is connected to a source of hand soap. In kitchen sink arrangements, outlet 63 is connected to a source of dishwashing detergent. In further embodiments, outlet 63 is connected to more than one source of cleaning fluid and the particular cleaning fluid dispensed is selected through different user gestures detected by sensor 65 and/or other sensors.

A water fountain outlet 67 is disposed on an upper surface of dispensing arm 13 adjacent distal end 15. Outlet 67 is directed substantially upwardly and outwardly from dispensing arm 13. Outlet 67 is adapted to dispense drinkable water in a substantially upward and outward direction towards a user to facilitate easy drinking in a manner similar to known water fountains. Outlet 67 is responsive to a gesture detected by sensor 69 disposed on base 5 adjacent display 45.

Mixer Valve

Dispenser 3 is adapted to be fitted with a number of conventional mixer valves (not shown). The mixing valve includes a pair of mixing disks (not shown) embedded within upper portion 11 of base and being rotatable relative to each other about a central axis.

Referring to FIGS. 5 to 9, dispenser 3 includes a mixer valve 71 for selectively dispensing four fluids at predetermined temperatures. Mixer valve 71 includes two like cylindrical disks 73 and 75 disposed axially adjacent and substantially parallel and adjacent each other. Both upper and lower disks 73 and 75 are disposed within upper portion 11 of base 5. Upper disk 73 is fixedly mounted to handle 9 by shaft 77 and is rotatable about an axis with respect to lower disk 75.

Figure 6:
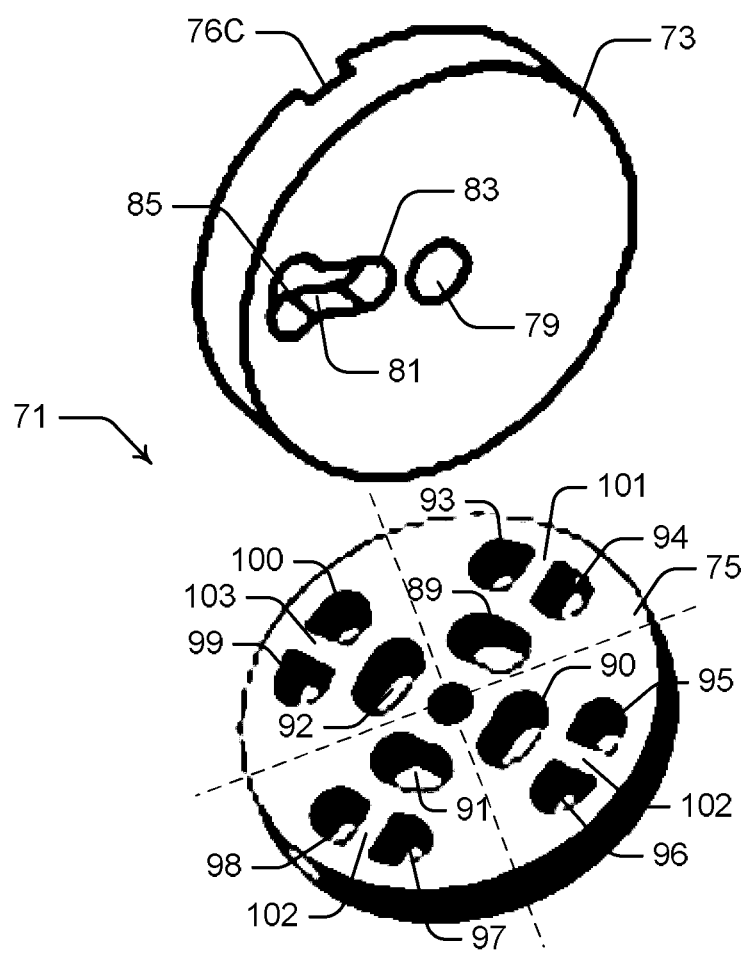
FIG. 6 illustrates an exploded view of the mixer valve illustrated in FIG. 5.

Upper disk 73 includes notches 76A to 76C which mesh with complementary teeth of a drive gear (not shown). The drive gear is driven by a step motor and the motor forms part of actuator system 29. Referring now to FIG. 6, upper disk 73 includes a central axial hole 79 for receiving shaft 77. Upper disk 73 also includes a mixing passage 81, which extends in a radial direction from an inner region 83 to a substantially wider outer region 85. Passage 81 is open at a bottom edge of disk 73 and extends partway through disk 73 in the axial direction.

Lower disk 75 includes a central axial hole 87 for receiving shaft 77 about which disk 75 rotates. Located circumferentially around hole 87 are four groups of three dispensing apertures 89 to 100. Each group is disposed in a separate quadrant of the disk. Each group includes a pair of outer input apertures 93 to 100 and an inner output aperture 89 to 92. Input apertures of each respective pair are substantially symmetric in shape about respective divider regions 101 to 104, which circumferentially separate the pairs. A first input aperture of each pair is in fluid communication with a source of cold fluid while a second input aperture of each pair is in fluid communication with a source of hot fluid. Input apertures from different groups are connected with sources of different fluids. Output apertures 89 to 92 are substantially elongate and extend circumferentially so as to be at least partially circumferentially aligned with both input apertures in the same group. In the case of dispensing water, the output aperture is in fluid communication with outlet 49 of dispensing arm 13.

Figure 7:
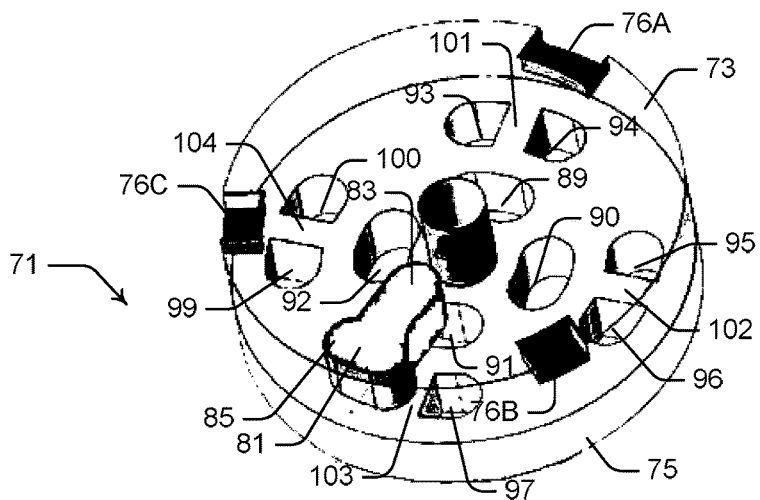
FIG. 7 illustrates a first elevated perspective view of the mixer valve of FIGS. 5 and 6.
Figure 8:
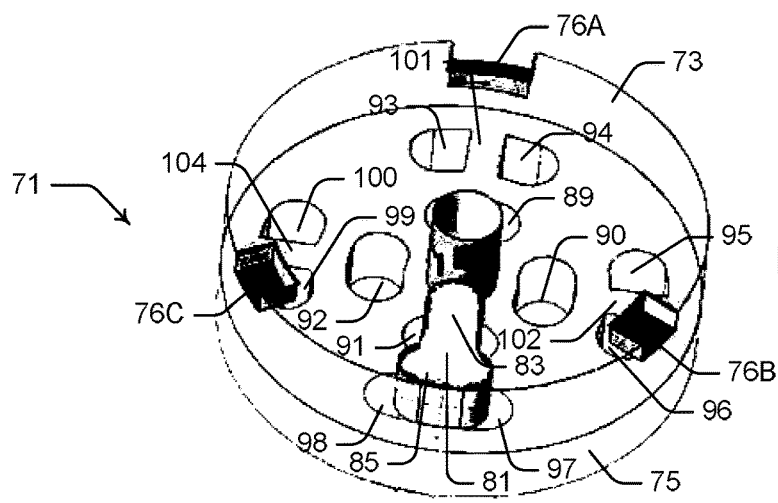
FIG. 8 illustrates a second elevated perspective view of the mixer valve of FIGS. 5 and 6.
Figure 9:
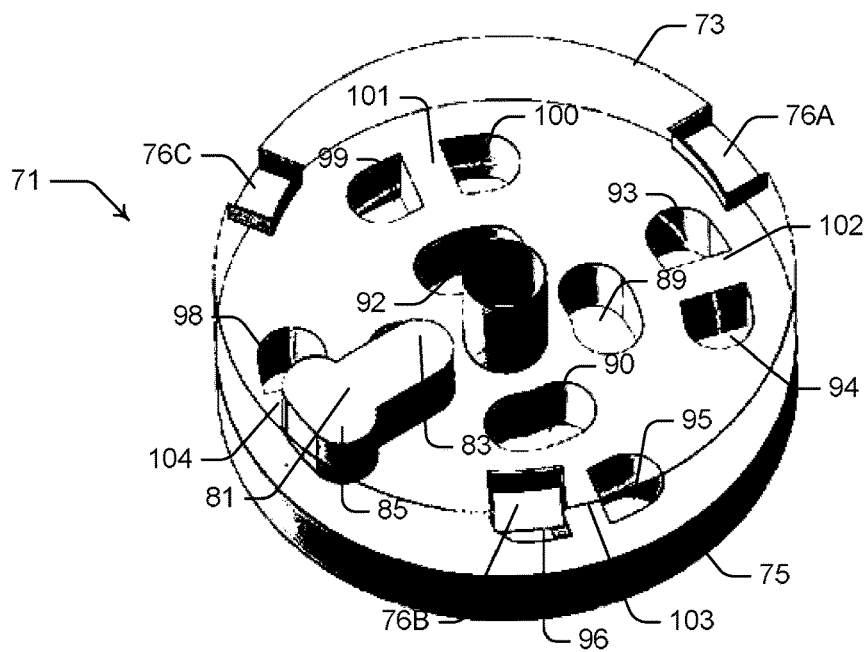
FIG. 9 illustrates a third elevated perspective view of the mixer valve of FIGS. 5 and 6.

The step motor is responsive to the input signals (from a gesture) and/or the control signal to actuate the mixer valve by selectively rotating upper disk 73 with respect to lower disk 75. As shown in FIG. 7, when outer region 85 of passage 81 is aligned with cold water aperture 98 and out of alignment with hot water aperture 97, only cold water is passed through passage 81 and is dispensed through outlet 49. As shown in FIG. 8, when outer region 85 of passage 81 is partially aligned with both cold water aperture 98 and hot water aperture 97, a mixture of hot and cold water is passed through passage 81 and warm water is dispensed through outlet 49. As shown in FIG. 9, when outer region 85 of passage 81 is aligned with hot water aperture 97 and out of alignment with cold water aperture 98, hot water is passed through passage 81 and is dispensed through outlet 49.

In this manner, it will be understood that, by controlling the angle of upper disk 73 with respect to lower disk 75, water can be dispensed from dispenser 3 at a temperature determined at least in part by the sensed gesture and/or the user preferences through the control signal. Other fluids are dispensed in a similar manner by applying a corresponding 90°, 180° or 270° rotation to align passage 81 with the apertures of another group disposed in another quadrant of disk 75. As such, mixer valve 71 is capable of dispensing four fluids at a predetermined temperature. Other fluids include filtered water, flavoured beverages, detergents or the like.

A correspondence between angle and temperature is made by accessing a lookup table or the like in database 27 such that a received gesture or user preference is transformed by processor 19 into a corresponding angle to be applied by the step motor.

In some embodiments, the automatic temperature control action described above can be overridden by manual actuation of handle 9 or through actuation of button 47. In this case, a user is able to manually rotate handle 9 with respect to base 5 to control the particular fluid dispensed and the mixture of hot and cold fluid (and hence the temperature of the fluid) in a manner known in the art. A lifting of the handle also controls the volume and pressure of the fluid being dispensed.

In one embodiment, one or more of display 31, display 33 or screen 45 is adapted to display the estimated temperature of the fluid being dispensed, either by the automatic method mentioned above or by manual actuation.

It will be appreciated that mixer valve 71 has other applications such as dispensing a plurality of different beverages through different beverage supply lines. In certain embodiments, the step motor is configured to intermittently rotate passage 81 into alignment with a water source to wash passage 81. This is particularly useful when output apertures 93 to 100 are all connected with a common dispensing outlet In another embodiment (not shown), dispenser 3 includes a separate pressure control valve having a gear, cam or flange engagable with a step motor. The step motor also forms part of the actuator system and is responsive to the sensor signals and/or control signal to actuate the pressure control valve so as to dispense the first fluid from the fluid dispenser at a pressure and/or flow rate determined at least in part by the sensed gesture.

It will be appreciated that mixer valve 71 is able to be incorporated into other fluid dispensers in a manner similar to that of conventional mixer valves.

As will be described below, the mixing head can be bypassed under certain conditions and water can be sourced from the respective sources through a fluid processing system and a further temperature control system.

Additional Temperature Control

In addition to temperature control by mixer valve 71, in some embodiments, temperature control is also provided in part by one or more heater units disposed along the input fluid lines or multiple fluid lines of different temperature. Three exemplary embodiments where additional temperature control is provided are illustrated in FIGS. 10 to 12.

Figure 10:
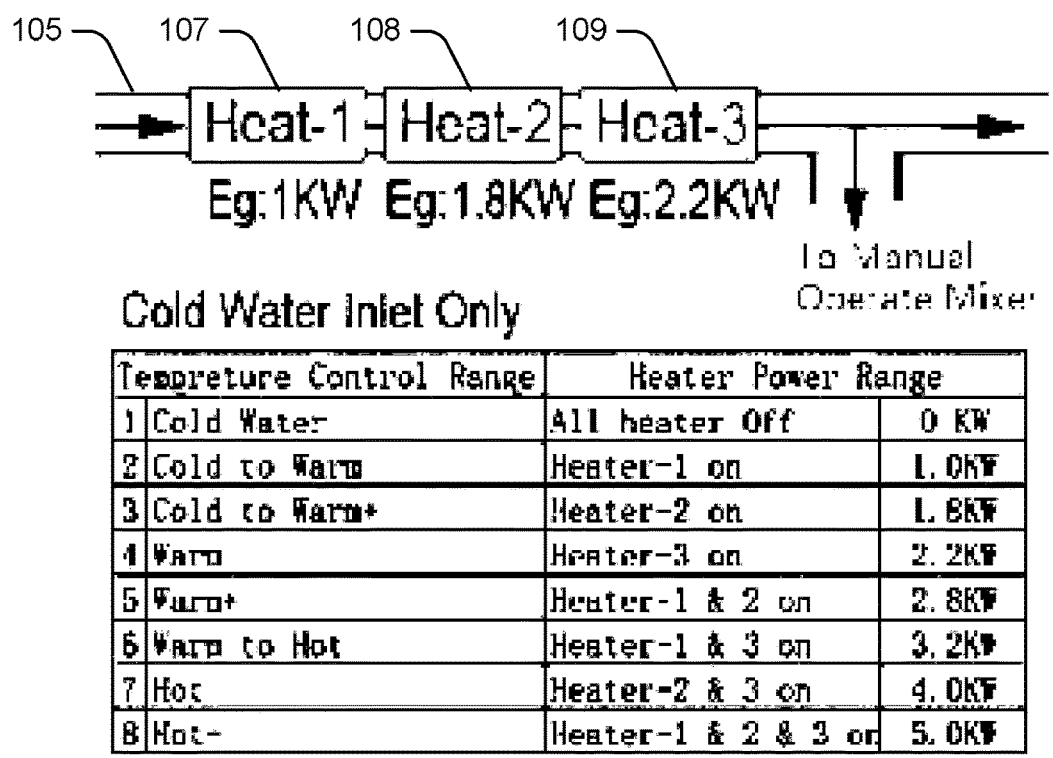
FIG. 10 illustrates a first exemplary temperature control line and an associated data table.

In FIG. 10, a single input fluid line 105 is provided with three heater elements 107 to 109 disposed in series. The heaters have three different power levels for respectively providing different levels of heating to the fluid passed therethrough. In response to an input gesture by a user, the heater elements are selectively actuated singularly or in combination as per the table in FIG. 10.

Figure 11:
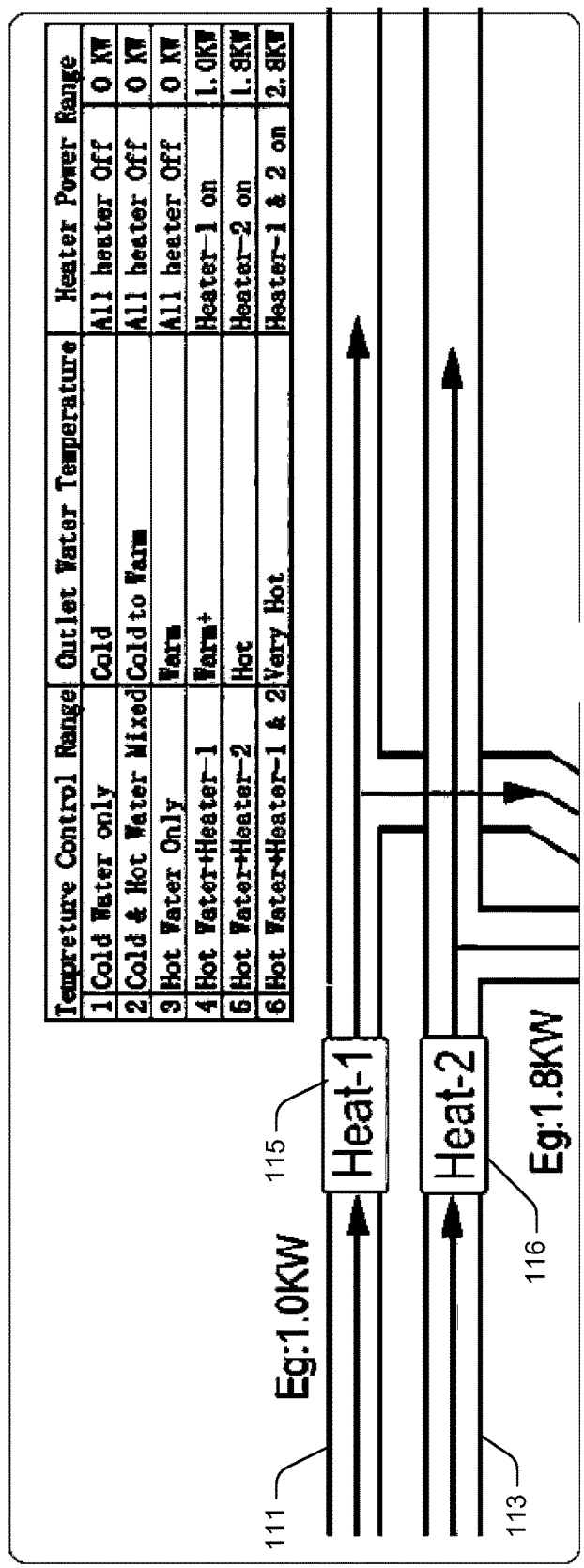
FIG. 11 illustrates a second exemplary temperature control line and an associated data table.
Figure 12:
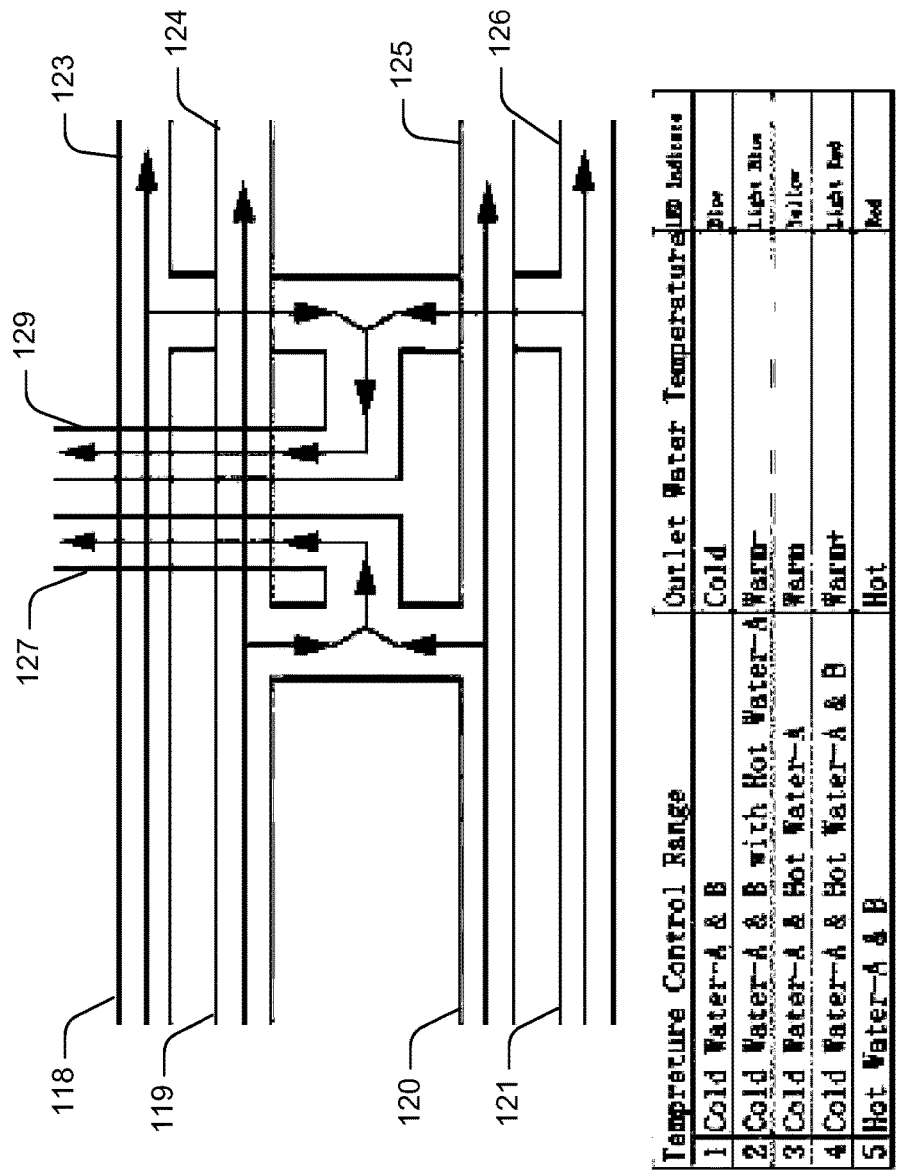
FIG. 12 illustrates a third exemplary temperature control line and an associated data table.

In FIG. 11, two fluid lines 111 and 113 are provided in parallel; a first fluid line 111 providing cold water and a second fluid line 113 providing hot water. A pair of heaters 115 and 116 is disposed on the fluid lines to independently raise the temperature of the cold and hot water in the respective fluid lines based on input gestures by the user. Possible output water temperatures are illustrated in the table.

Furthermore, in some embodiments the power output and thus heating power of the respective heaters in the embodiments described above is able to be selectively varied in response to an input gesture by a user to provide more combinations of output water temperature. Thus, in another embodiment, each of the cold and hot water lines includes only a single corresponding heater of variable power to selectively increase the water temperature above the ambient temperature of the respective cold and hot water sources.

In FIG. 12, four fluid lines 118 to 121 are provided; lines 118 and 121 for providing cold water and lines 119 and 120 for providing hot water. Direct outputs 123 to 126 provide water at the respective input temperatures while mixing lines 127 and 129 mix the respective hot and cold water to produce warm water. The fluid lines are then passed through mixer valve 71 to provide further temperature adjustment.

Hand Dryer

Figure 13:
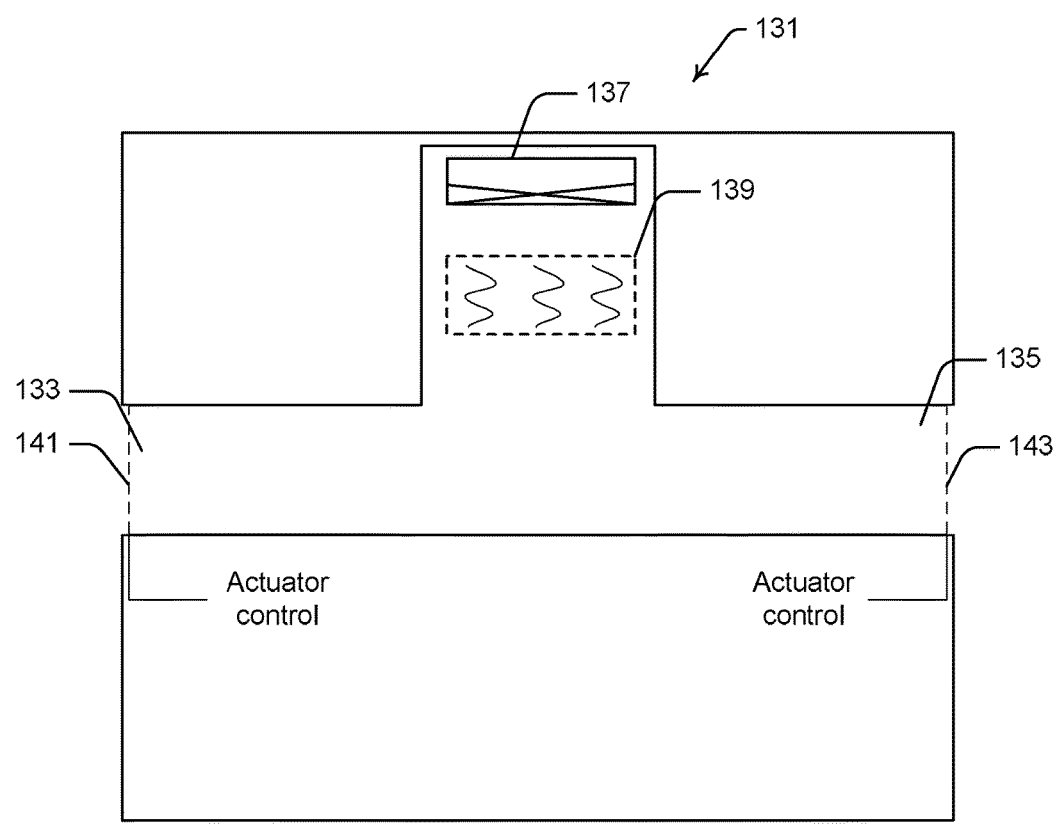
FIG. 13 illustrates a schematic front sectional view of a hand dryer unit incorporated into the dispenser of FIGS. 1 and 2.

Referring again to FIGS. 1 and 2, system 1 includes a hand dryer unit 131 embedded within dispensing arm 13. Referring now to FIG. 13, dryer unit 131 includes first and second elongate apertures 133 and 135 disposed on opposite sides of dispensing arm 13 and positioned to enable drying of a user's left and right hands respectively. Airflow is generated by an internal fan 137 and the air is heated by a heating element 139. The heated airflow is egressed through one or both of apertures 133 and 135 in respective directions. Apertures 133 and 135 include respective valves 141 and 143, which are selectively actuatable to allow the egression of air through one or both of apertures 133 and 135. Fan 137, heater 139 and valves 141 and 143 are responsive to the input signal and/or control signal to generate and direct airflow at a pressure, volume and/or temperature determined at least in part by the sensed gesture. In some embodiments, valves 141 and 143 are independently responsive to different gestures.

Fluid Monitoring and Processing System

Figure 14:
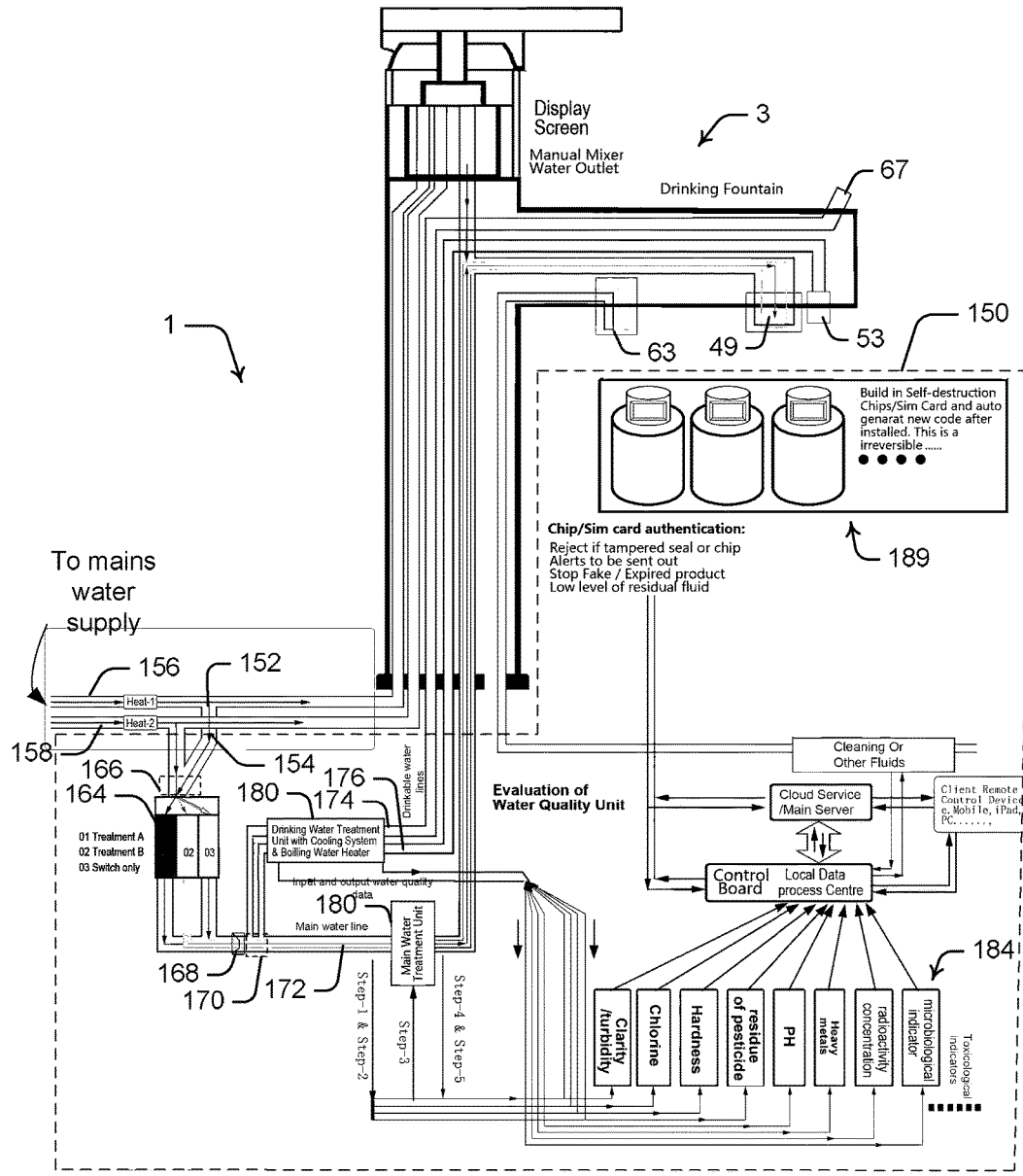
FIG. 14 illustrates schematically a system-level diagram of a fluid monitoring and processing subsystem.

Referring to FIG. 14, in one embodiment, system 1 includes an associated water monitoring and processing subsystem 150. Although described in relation to system 1, it will be appreciated that water monitoring and processing subsystem 150 is able to be manufactured as a standalone unit and retrofitted to other commercially available water dispensing systems.

Subsystem 150 includes two inlets 152 and 154 to respectively tap off hot and cold untreated water from input conduits 156 and 158 supplying water from an upstream source such as a mains water supply. Water not tapped off through inlets 152 and 154 continues along main fluid lines 160 and 162 to the mixer valve of fluid dispenser 3. In cases where only a single input conduit is provided, subsystem 150 includes only a single inlet. The choice of whether or not to pass the water through subsystem 150 is determined by a user gesture, which actuates respective valves on inlets 152 and 154.

Within subsystem 150, the water is initially passed through a pre-processing unit 164 to conduct a preliminary processing of the water. Based on input user gestures and/or predefined user preferences, the water is passed through one of a number (three illustrated) treatment paths. Each treatment path applies different levels of filtering and/or processing to the input water. The appropriate treatment path is selected by an actuator valve 166 responsive to the user gestures and/or user preferences. Pre-processing may also include a predetermined flow control of the input water.

At the output of pre-processing unit 164, the water is passed through a flow control valve 168 such as a check valve or unidirectional valve, which ensures the water only flows in the forward direction.

At this point, the water reaches another actuatable valve 170, which is also responsive to input user gestures and/or predefined user preferences. Valve 170 acts to divert water between a main water line 172 and drinkable water lines 174 and 176. Main water line ultimately dispenses water from primary fluid outlet 49. Drinkable water lines 174 and 176 ultimately dispense water respectively from drinking water outlet 53 and fountain outlet 67.

The water next passes through a primary treatment system. In FIG. 14, this is illustrated as both main water treatment unit 178 and also drinking water treatment unit 180. Although these are illustrated as separate units, it will be appreciated that they are able to share common hardware, as will be described below.

Figure 15:
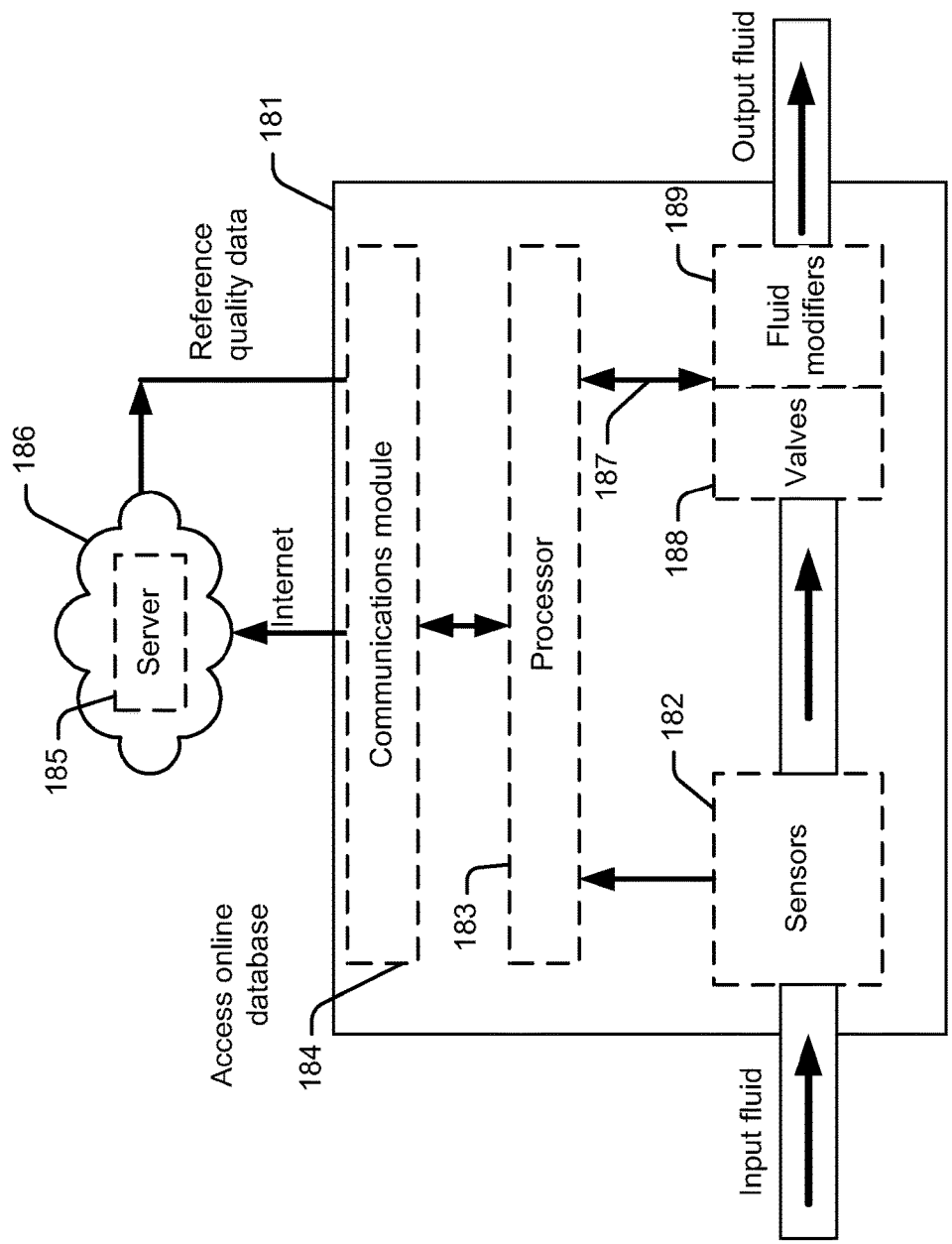
FIG. 15 illustrates schematically a system-level diagram of a primary treatment system of the processing subsystem of FIG. 14.

An exemplary primary treatment system 181 is illustrated schematically in FIG. 15. System 181 includes a plurality of sensors 182 disposed within the fluid input in contact with a flow of the fluid from the pre-processing unit 164. The sensors 182 are configured to sense one or more characteristics of the fluid within a sensing zone and, in response, generate data indicative of the fluid quality. This is performed in real or near-real time and the generated fluid quality data is passed to a processor 183 and stored in local storage. A communications module 184 is configured to remotely access an online database of reference fluid quality data stored within a server 185 on the internet 186. In some embodiments, the fluid quality data is passed to server 185 for storage on networked resources such as a cloud server. In another embodiment, communications module 184 is not internet enabled but is in wired or wireless communication with a local computer having a relevant database stored thereon. Processor 183 is configured to compare the fluid quality data measured from sensors 182 with reference fluid quality data and, in response, generate a control signal 187. Control signal 187 may also be defined in part by one or more predefined user settings applied locally or through server 185.

Control signal 187 is passed to a series of actuatable valves 188 and one or more fluid modifier devices 189. The valves 188 selectively direct the water through predetermined ones of the fluid modifier devices 189 based on the control signal. Further, the fluid modifier devices 189 selectively modify the components of the fluid based on the control signal 187.

As illustrated in FIG. 14, exemplary sensors 182 include clarity/turbidity sensors, chlorine sensors, fluid hardness sensors, residual pesticide sensors, pH sensors, heavy metals sensors, radioactivity concentration sensors and microbiological sensors. In another embodiment directed to flavoured beverage dispensers, sensors 182 include sugar content sensors and/or artificial flavouring sensors.

Exemplary valves 188 include concatenated mixer valves such as valve 71 described above. Corresponding relative rotations of the concatenated mixing disks create fluid passages to direct the water to corresponding ones of the fluid modifier devices 189.

Exemplary fluid modifying devices 189 include various filters such as particle filters and chemical filters, flavour additives (in the case of flavoured beverage dispensers) and electronic fluid processors such as electrolysis devices and chemical separators. In one embodiment, the fluid modifier devices 189 include one or more component sources and associated component dispensers for selectively dispensing a component into the fluid.

The above fluid processing can equivalently be performed on water and other fluids alike. However, the particular database accessed will generally be different for different fluids. Equivalently, the corresponding processing will be different depending on the fluid to be processed. By way of example, drinking water will be subject to a more rigorous comparison and processing than water intended for everyday use.

As illustrated in FIG. 14, a junction exists between the main water line of the processing sub-system 150 and the main water line from the mixing valve 71. As such, water may be dispensed through primary fluid outlet 49 from either the processing subsystem 150 or mixing valve 71 or both. This allows the mixing valve 71 to be bypassed in cases where some form of fluid processing is desired to be performed.

In some embodiments, the fluid modifiers are also in communication with server 185 a secure type of fluid modifier is used which includes a security chip having a unique product identifier. The product identifier is a code or number that is linked with a corresponding product code of the system in which it is installed. When a new modifier device is installed, the product identifier is checked by the server 185 to determine its compliance with the associated system and/or its authenticity from pirated devices.

Figure 16:
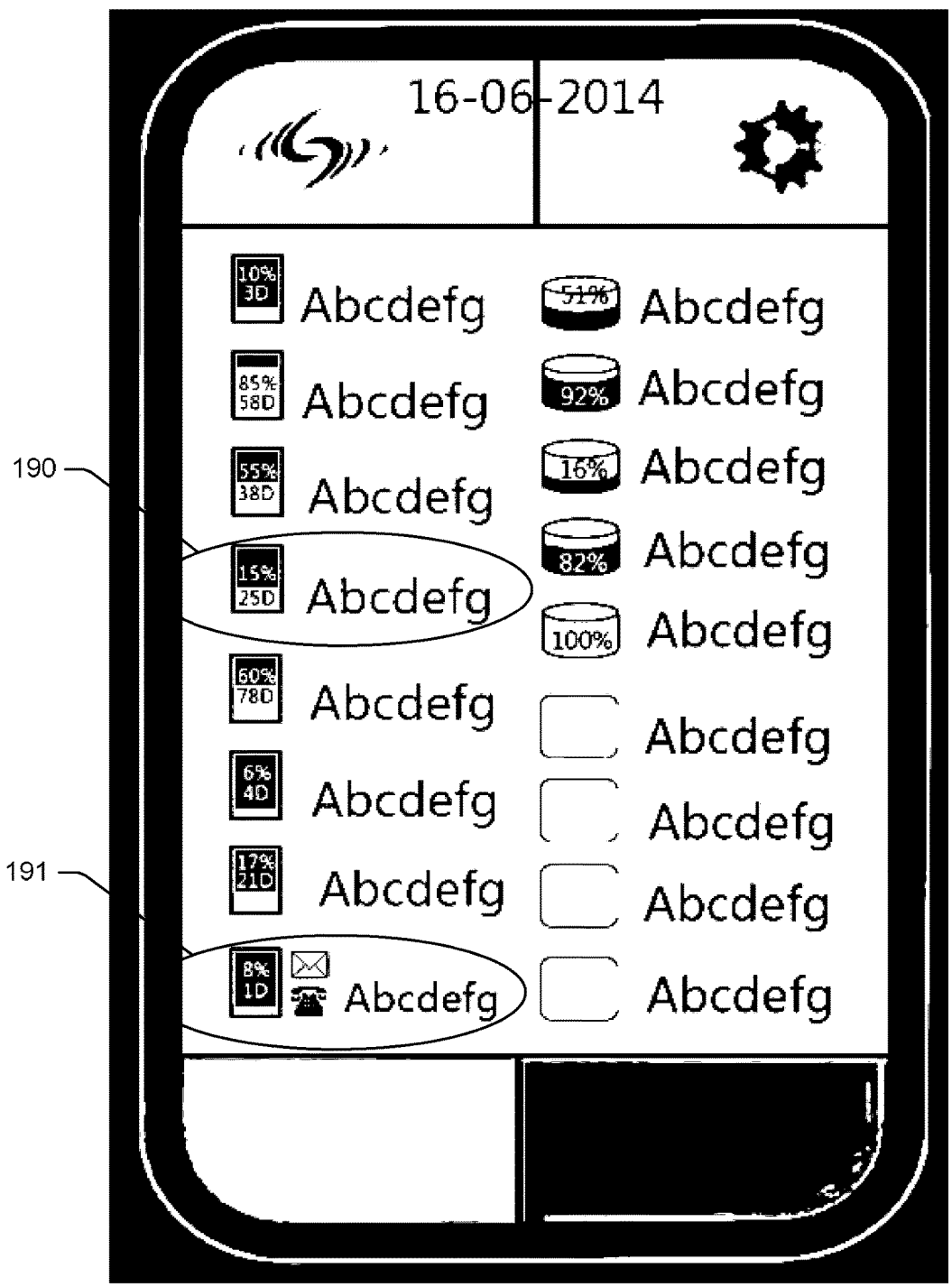
FIG. 16 illustrates an exemplary screenshot of a touchscreen display showing performance monitoring of a number of fluid modifying devices.

In some embodiments, capability is provided to monitor the performance and/or usage of each fluid modifier device. For example, a filter device may be monitored to determine its remaining filter capacity (e.g. in a percentage) or useful lifetime (e.g. in number of days). In one embodiment, this monitoring capability is facilitated using touchscreen display 31. Referring to FIG. 16, there is illustrated an exemplary screenshot of display 31 illustrating the performance monitoring of a number of fluid modifying devices (e.g. 190). Depending on the type of modifying device, different performance metrics are illustrated. Device 190 relates to a filter device which, as shown, currently has 15% capacity remaining or 25 days of useful life. Item 191 illustrates a filter device that is almost empty. Selectable telephone and email icons are displayed to enable a user to order a replacement device. In another embodiment, other icons are displayed which link the user to a relevant website where replacement parts can be ordered. The product identifier code mentioned above can be used to easily order a replacement for the same device.

In one application, the above described fluid processing subsystem 150 is used to dispense a number of flavoured beverages from a dispenser having a single fluid line. In this application, water is input through conduits 156 and 15 as mentioned above and is carbonated and flavoured by fluid modifying devices 189. A first modifying device acts as a carbonator to carbonate the input water (which may have already been subject to various filtering and quality control by pre-processing unit 164 or treatment unit 180) and further fluid modifying devices, in the form of flavoured syrup dispensers, selectively add various flavours before dispensing. Overall, this dispenser operates to produce mixed beverages in a similar manner to existing multi-line fountain drink dispensers. However, as devices 189 are selectively actuatable, the flavour addition can be simply deactivated to flush clean water through the single fluid line before dispensing a subsequent flavoured fluid. Thus, only a single fluid line is required.

Similarly, subsystem 150 can be used to dispense various fluids through a single fluid line with the capability to clean the fluid line between dispensing different fluids by flushing fresh water through the fluid line. This flush cleaning operation can be performed manually by a user or automatically by system 1.

Fluid Disposal System

Figure 17:
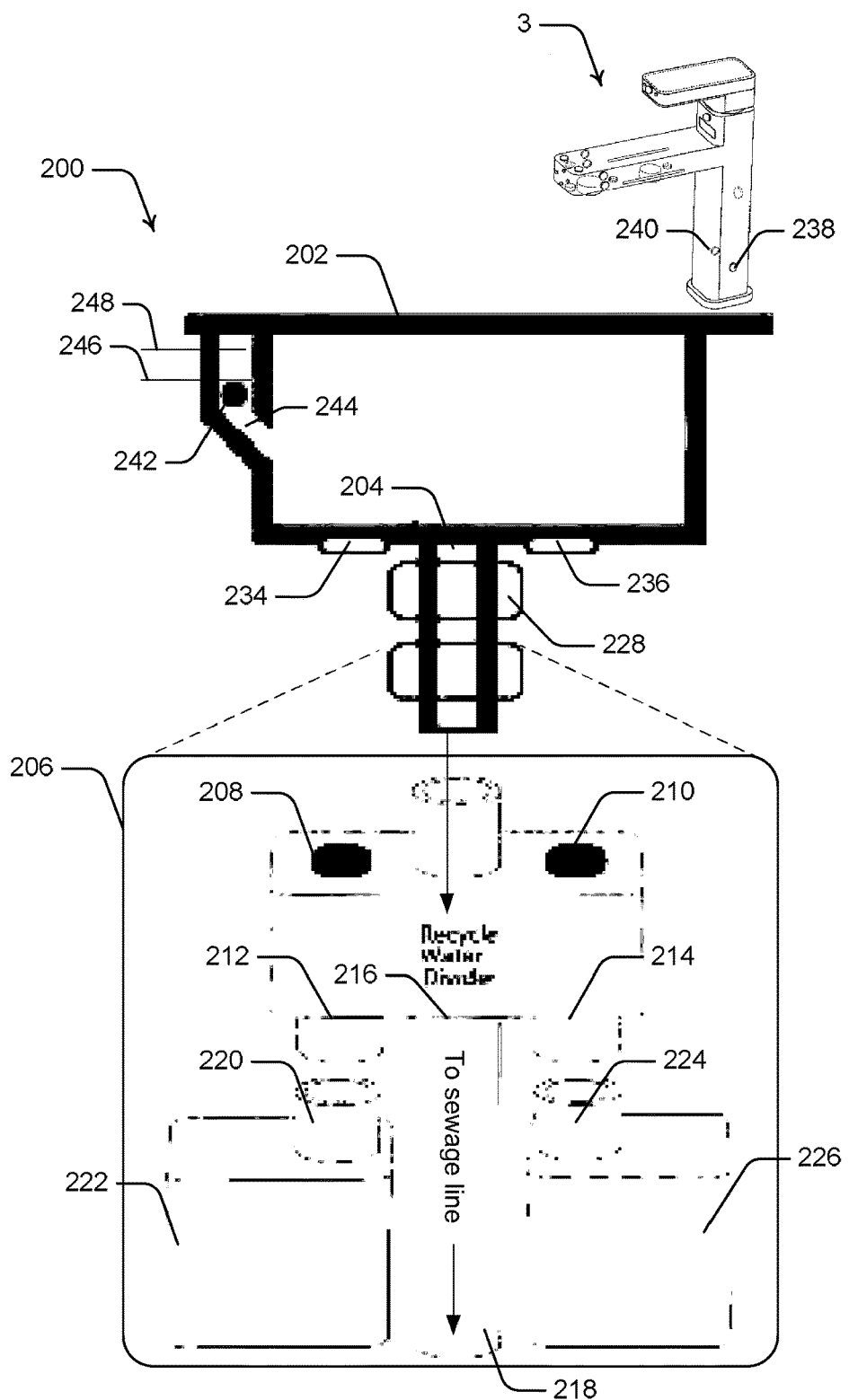
FIG. 17 illustrates schematically a system-level diagram of a fluid disposal subsystem.

Referring now to FIG. 17, system 1 includes a sub-system 200 for processing waste material. Sub-system 200 includes a fluid receptacle in the form of a sink 202 having a drainage conduit 204 for receiving fluids and other waste materials. Dispenser 3 is mounted onto or adjacent sink 202 and connected to respective fluid sources, a power source and a network connection. Drainage conduit 204 is connected to a fluid processing unit 206, including sensors 208 and 210 disposed within conduit 204. Sensors 208 and 210 are situated so as to be exposed to a flow of the waste material, which may include water and other fluids dispensed from dispenser 3 as well as other materials (solid, liquid or gas) that has entered conduit 204 from sink 202. These other materials include, inter alia, food waste, particulate materials and chemical detergents. In another embodiment, sensors 208 and 210 are mounted to the base of sink 202 at a position adjacent drainage conduit 204.

Sensor 208 (which may include a single sensor or multiple sensors) are configured to sense the presence or concentration of one or more components within the waste material passed through conduit 204. Example components include chemicals such as cleaning liquids and detergents, salinity sensors and pH sensors. Sensor 201 is a turbidity sensor configured to detect the turbidity level of the waste material.

In response to detecting various chemicals or turbidity levels, sensors 208 and 210 generate collective or separate sensor signals, which are received by three actuators configured to actuate respective valves 212, 214 and 216. These valves open or close in response to the detected sensor signals. The actuators and valves selectively direct the waste material into one of three output conduits. As illustrated in FIG. 15, unit 206 includes a sewage output conduit 218 in fluid connection with a mains sewage line, a recycling conduit 222 in fluid connection with a recycling system 224 and a chemical processing conduit 226 in fluid connection with a chemical processing system 228. Chemical processing system 226 may in turn be connected with the mains sewage line once hazardous chemicals are removed. It will be appreciated that, in other embodiments, fewer or greater sensors, conduits and actuators/valves are able to be incorporated into unit 206.

In a case where no or a low amount of hazardous chemicals are detected by sensors 208 and sensor 210 detects a turbidity below a predetermined threshold, valves 214 and 216 are closed and valve 212 is opened to selectively direct the waste material into the recycling conduit 220. When hazardous chemicals are detected by sensors 208, valves 212 and 216 are closed and valve 214 is opened to selectively direct the waste material into chemical processing conduit 224. When no or a low amount of hazardous chemicals are detected by sensor 208 but a high turbidity level is detected by sensor 210, valves 21 and 214 are closed and valve 216 is open to selectively direct the waste material into sewage output conduit 218.

Referring still to FIG. 17, system 200 includes touchless plug control functionality for selectively releasably sealing a plug valve 228 within conduit 204 of sink 202. Actuator system 29 includes an actuator (not shown) to control the opening and closing of valve 228, which is disposed within an upper section of drainage conduit 204. The actuator of valve 228 is responsive to the input signals to selectively open and close the valve upon sensing of a predefined gesture. When closed, valve 228 prevents fluid and material from flowing from sink 202 through conduit 204 in the conventional manner of a plug.

Figure 18:
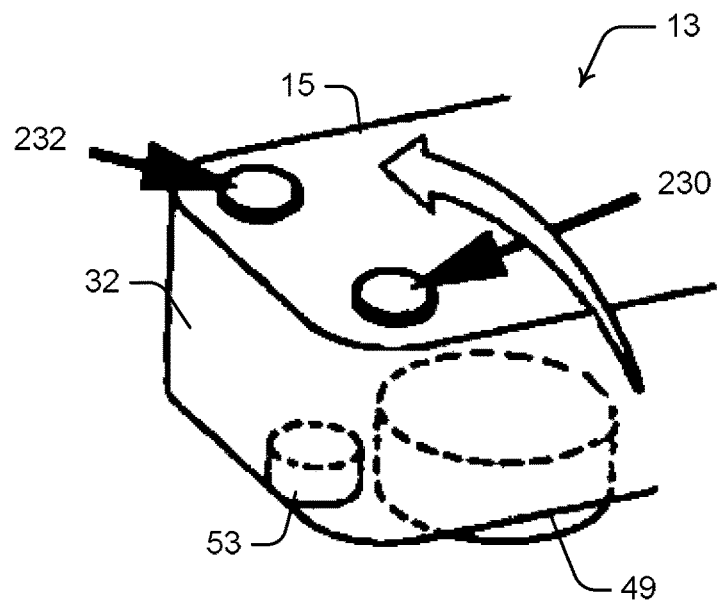
FIG. 18 illustrates an exemplary motion of a user gesture to open a plug valve.
Figure 19:
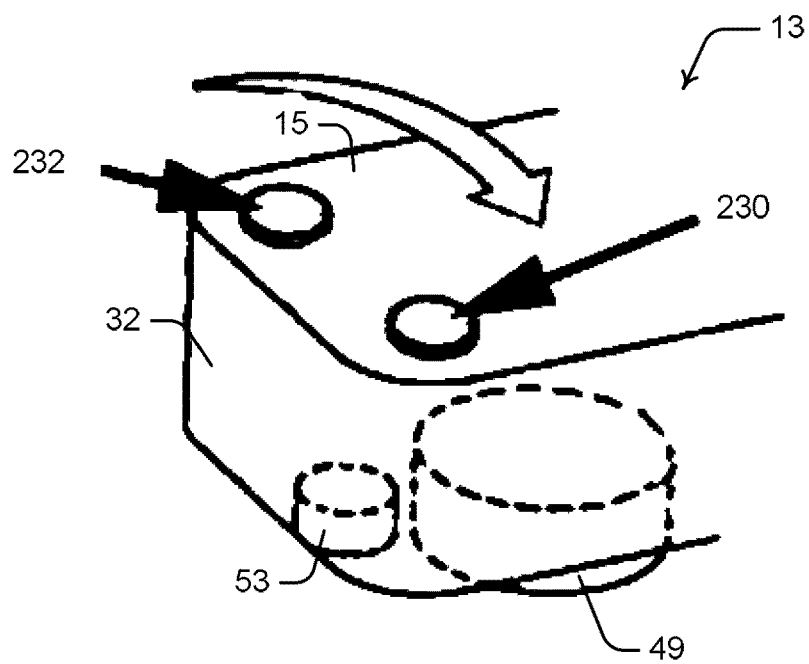
FIG. 19 illustrates an exemplary motion of a user gesture to close a plug valve.

Referring to FIGS. 18 and 19, in one embodiment, the gesture to close valve 228 ("plug on" gesture) is performed by moving a user's hand (or other object) sequentially through the sensor fields of sensors 230 and 232 within a predetermined time period in a right-to-left motion. Conversely, the gesture to open valve 228 ("plug off" gesture) is performed by moving a user's hand (or other object) sequentially through the sensor fields of sensors 230 and 232 within a predetermined time period in a left-to-right motion.

Referring again to FIG. 17, a pair of ultrasonic washing units 234 and 236 are mounted on opposite sides of a base of sink 202. Washing units 234 and 236 are responsive to an input signal received based on a gesture detected by sensors 238 and 240, which are disposed on opposite sides of base 5, as shown in FIG. 1. Left sensor 238 activates and deactivates washing unit 234 while right sensor 240 activates and deactivates washing unit 236. Washing units 234 and 236 are configured to emit ultrasonic pressure waves to agitate a fluid contained in sink 202 and clean objects such as dirty dishes. In another embodiment, only a single ultrasonic washing unit is mounted to sink 202. In a further embodiment, more than two ultrasonic washing units are mounted to sink 202. In one embodiment, washing units 234 and 236 are operatively associated with sensors similar to sensors 208 and 210 for controlling the output flow of the fluid in sink 202.

Sink 202 includes a fluid level sensor 242 disposed within a cavity 224. Sensor 242 is adapted to detect when the fluid level in sink rises to first and second levels 246 and 248. At the first level 246, sensor 242 issues a warning signal to a speaker or the like to emit an audible warning sound. The warning signal may also initiate a visual warning on display 31, display screen 45 or may actuate one or more LEDs 35 to 38 in a predetermined fashion. At the second level 248, sensor 242 issues a control signal to a corresponding actuator to shut off the fluid flow from dispenser 3 or, alternatively, open valve 228 to release some fluid from sink 202.

CONCLUSIONS AND INTERPRETATION

It will be appreciated that the disclosure above provides various significant fluid dispensing systems, a system for processing waste material and a fluid monitoring system. It will also be appreciated that aspects of the systems described above are able to be implemented as standalone units or retrofitted to existing fluid dispensing systems.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

Unless specifically stated otherwise, as apparent from the following discussions, it is appreciated that throughout the specification discussions utilizing terms such as "processing," "computing," "calculating," "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A fluid dispensing system comprising:
a fluid dispenser in fluid communication with a plurality of fluid sources, wherein the fluid dispenser comprises a plurality of fluid outlets comprising a primary fluid outlet fluidly coupled to a first fluid source of the plurality of fluid sources and a drinkable water outlet fluidly coupled to a second fluid source of the plurality of fluid sources, and wherein:
the first fluid source provides a first fluid with a first predefined characteristic; and the second fluid source provides a second fluid, the second fluid comprising a second predefined characteristic, the second predefined characteristic comprising a filtration or purification quality of the second fluid;

an identification device that identifies a user of the system and generates a user identifier;

a processor that accesses a database to retrieve user data corresponding to the user identifier and indicative of one or more user preferences and, generates a control signal in response to retrieved user data;

a plurality of electrical sensors that sense a gesture motion from the user and, in response to a sensed gesture motion, generate a local input signal, wherein the gesture motion includes a movement of an object through detection fields of the plurality of electrical sensors;

wherein the processor is responsive to the local input signal to distinguish the sensed gesture motion from a plurality of predefined gestures; and an actuator system that dispenses the first fluid from the primary fluid outlet, dispenses the second fluid from the drinkable water outlet, or dispenses both the first fluid from the primary fluid dispenser and the second fluid from the drinkable water outlet, based on the control signal and the local input signal.

2. The fluid dispensing system of claim 1, wherein:
the database is accessible through a remote server; and
the fluid dispensing system further comprises a network communication device that accesses the remote server to retrieve the user data in response to an instruction received from the processor.

3. The fluid dispensing system of claim 1, wherein the plurality of fluid sources comprise at least one source of hot water and one source of cold water.

4. The fluid dispensing system of claim 3, wherein the fluid dispenser comprises a mixer valve and the actuator system actuates the mixer valve so as to dispense the first fluid, the second fluid, or both the first fluid and the second fluid from the fluid dispenser at a temperature determined at least in part by the sensed gesture motion in response to at least one of the input signal and the control signal.

5. The fluid dispensing system of claim 1, wherein the fluid dispenser comprises a pressure control valve and the actuator system dispenses the first fluid, the second fluid, or both the first fluid and the second fluid from the fluid dispenser at one or more of a pressure and a flow rate in response to at least one of the local input signal and the control signal, wherein the one or more of the pressure and the flow rate is determined at least in part by the sensed gesture motion.

6. The fluid dispensing system of claim 1, the fluid dispensing system further comprising a hand dryer unit that generates airflow at one or more of a pressure, a volume, and a temperature in response to at least one of the input signal and the control signal, wherein the one or more of the pressure, the volume, and the temperature is at least partially determined by the sensed gesture motion.

7. The fluid dispensing system of claim 1, wherein:
the fluid dispenser is configured for mounting adjacent a fluid receptacle to receive dispensed fluid,
the fluid dispensing system further comprising an ultrasonic washing unit having one or more ultrasonic emitters mounted in or adjacent to the fluid receptacle, and
the one or more ultrasonic emitters being responsive to a gesture.

8. The fluid dispensing system of claim 7, wherein the actuator system is responsive to the input signal to selectively open and close a valve to releasably seal a drainage aperture in the fluid receptacle upon sensing of a predefined gesture.

9. The fluid dispensing system of claim 1, wherein the identification device comprises one or more of:
one or more of a Bluetooth device and an NFC device, wherein the one or more of the Bluetooth device and the NFC device are configured to communicate wirelessly with a nearby mobile user device to obtain the user identifier,
a camera configured to capture an image of the user's face, wherein the processor is configured to execute facial recognition on the image of the user's face to generate the user identifier, and
a fingerprint scanner configured to capture an image of the user's fingerprint and wherein the processor derives the user identifier from the image of the user's fingerprint.

10. The fluid dispensing system of claim 1, wherein the control signal includes comprises a preferred water temperature or water flow rate for the user.

11. The fluid dispensing system of claim 1, wherein the first predefined characteristic comprises at least one of one or more predefined characteristics, the one or more predefined characteristics comprising one or more of a predefined temperature, a predefined flow rate, a predefined dispensing time, a predefined distribution profile, and a predefined fluid quality.

* * * * *